United States Patent
Gurbani et al.

(10) Patent No.: US 8,024,401 B1
(45) Date of Patent: Sep. 20, 2011

(54) CUSTOMER RELATIONSHIP MANAGEMENT SYSTEM WITH NETWORK CONTACT CENTER SERVER CONFIGURED TO CONTROL AUTOMATED WEB AND VOICE DIALOGUES

(75) Inventors: Vijay K. Gurbani, Lisle, IL (US); Suhasini Sabnis, Marlboro, NJ (US); Victoria Hiering, Toms River, NJ (US); Luis Nieto, Scotch Plains, NJ (US); Aniruddha Gokhale, Nashville, TN (US); Richard B. Hull, Chatham, NJ (US); Reinhard P. Klemm, North Plainfield, NJ (US); Bharat Kumar, Bridgewater, NJ (US); Gang Zhou, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 3626 days.

(21) Appl. No.: 10/161,040

(22) Filed: Jun. 3, 2002

(51) Int. Cl.
*G06F 15/16* (2006.01)
(52) U.S. Cl. ............... 709/204; 379/265.01; 379/266.01
(58) Field of Classification Search ............ 379/265.12, 379/265.01–266.01; 709/204, 227
See application file for complete search history.

(56) References Cited

U.S. PATENT DOCUMENTS

| | | | | | |
|---|---|---|---|---|---|
| 5,825,869 | A | * | 10/1998 | Brooks et al. | 379/265.12 |
| 5,828,747 | A | * | 10/1998 | Fisher et al. | 379/265.12 |
| 6,128,380 | A | * | 10/2000 | Shaffer et al. | 379/265.01 |
| 6,163,607 | A | * | 12/2000 | Bogart et al. | 379/266.01 |
| 6,704,409 | B1 | * | 3/2004 | Dilip et al. | 379/265.02 |
| 6,934,277 | B1 | * | 8/2005 | Werve et al. | 370/352 |

* cited by examiner

*Primary Examiner* — Ramsey Refai
(74) *Attorney, Agent, or Firm* — Ryan, Mason & Lewis, LLP

(57) ABSTRACT

A customer relationship management system is disclosed for matching a given work item with an agent. The system includes a database to hold customer information, agent information, and system information, and a network contact center server operative to receive the given work item from the customer and route it to the agent based at least in part on the information in the database. The network contact center server is configured to control the conduction of an automated web dialogue with the customer via a separate web server and is further configured to control the conduction of an automated voice dialogue with the customer via an interactive voice response system. The automated web dialogue and the automated voice dialogue are thereby both conductable under the control of the network contact center server.

19 Claims, 5 Drawing Sheets

CUSTOMER RELATIONSHIP MANAGEMENT SYSTEM WITH NETWORK CONTACT CENTER SERVER CONFIGURED TO CONTROL AUTOMATED WEB AND VOICE DIALOGUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to customer relationship management systems. More particularly, the present invention relates to multi-channel tracking, routing and managing of customer requests by one or more agents physically located at one or more locations to thereby create a virtual contact center.

The dramatic advent of business-to-business and business-to-consumer e-commerce operations has presented near endless opportunities in the Customer Relationship Management (CRM) market with an emphasis on customer satisfaction and retention. The availability of multi-channel customer interaction systems that combine telephone, the Internet, electronic mail, fax, and chat are quickly replacing traditional customer interaction methodologies, such as voice-only call centers. Furthermore, cost and efficiency considerations are driving the need for seamless interoperability of the front office CRM with other business functions such as back-office order management, order fulfillment, collection/analysis of customer behavior, and content management.

Conventional call center technology is primarily directed towards enhancing and personalizing customer contact for inbound and toll free public telephone network services. The traditional call center, however, is evolving into a "multimedia contact center" with a new set of drivers and operational challenges. These challenges include:
- Multi-channel customer interaction, including voice, data, image, text chat, email and fax;
- Personalization: enhanced caller segmentation and treatments based on customer profile, recent calling history, and current customer status, e.g., electronic shopping cart contents;
- Productivity: voice response interaction, speech recognition, sophisticated web content management, integrated workflow, agent desktop integration; and
- Geographic distribution: virtual contact centers that support global routing, distributed workforce, remote agents and PBX-free call centers.

Network service providers are well positioned to capitalize on the rapidly evolving drivers for a comprehensive contact center management solution. Service providers can address the technological challenges by leveraging their existing network assets, such as network elements, network services, administration and operations support systems, professional services, and intellectual property. Furthermore, a service provider hosted solution will have the advantage of achieving lower operating costs across multiple customers and will be a carrier-class solution with the ability to offer service level guarantees for performance, security and availability.

There is thus a need for a distributed and automated call center system that overcomes the challenges described above.

BRIEF SUMMARY OF THE INVENTION

The present invention presents a system and method that allows service providers to offer CRM services to their customers, referred to as merchants. The invention offers a solution framework by seamlessly integrating different networks, systems, web servers and services, databases, applications, automatic call distributor (ACD) enabled agents, remote agents and other resources to enable merchants to effectively service their client base, referred to as customers.

The system and method presented herein enables service providers to offer ACD capabilities as an enhanced network service. The invention explicitly manages agents by maintaining contact queues in the network; the agents may be connected to an ACD or might be remote. Programmable switch technology is used to support conference and call transfer functionality. Alternatively, the invention may route contacts to a merchant's local contact center (LCC) where a merchant owned ACD system manages individual agents. In this manner, the NCC can perform network level load balancing while allowing the merchant to take advantage of previous capital investments.

The present invention provides for centralized management control and intelligent distribution of multi-channel customer contacts to the most appropriate resource. Routing decisions are made by continuously gathering real-time event information from agents and other resources. Fully scriptable routing rules are also provided whereby merchants define scripts through a web-based interface. Routing rules may be based on a variety of factors, including the dialed number, caller entered digits, time of day, day of the week, web session data, external database lookups, agent skills, expected wait time, trunk/port availability, performance thresholds, etc. Preferably, routing of any stored contact information occurs simultaneous with delivery of a call event to an agent, thus personalizing the customer interaction. Support is also provided for automated dialogs with web-based customers, for example, presenting the customer with an expected wait time for agent availability or targeted promotional messages.

The present invention involves a system for matching a Customer Relationship Management work item with an agent, the work item transported from a customer to an agent by way of a network. The system comprises a database to hold customer information, agent information, and system status information in order to determine the state of the system. The system also comprises a network contact center server, the server operative to receive a work item from a customer and route it to the agent. The agent may comprise a plurality of agents which are geographically distributed.

According to some embodiments, the network contact center server routes the work item to the agent according to a flow logic instruction. The flow logic may route the work item to the agent according to an agent profile, the agent profile comprising data regarding an agent skill set. The flow logic may route the work item to the agent according to a time of day or day of the week that the work item was created. The flow logic may also perform load balancing to route the work item to the agent attending to the fewest number of work items. Similarly, the logic may perform a decision to determine the agent or group of agents with the skills to support the category of work item, and, within this set of agents, route the work item to the agent with the fewest number of work items.

According to other embodiments, the system comprises an interactive voice response system, the interactive voice response system under the control of the network contact center server and operative to conduct an automated dialogue with the customer. The network contact center server may utilize the interactive voice response system to collect additional information from the customer. The network contact center server may also merge the additional information collected from the user by the interactive voice response system to the work item. Furthermore, the automated dialogue may be stored on the database.

Other embodiments of the invention contemplate the network contact center server querying the agent profile to determine whether the agent is occupied and, if so, to place the work item in a queue. The network contact center server routes the work item to an agent if the agent is not occupied. The network contact center server sever may periodically query the agent to determine agent availability. The query to determine agent availability may be performed when a user defined threshold has been exceeded. The network contact center server removes the work item from the queue and routes the work item to the agent when the agent becomes available. After a time period has elapsed, the network contact center server removes the work item from the queue and routes the work item to any available agent.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
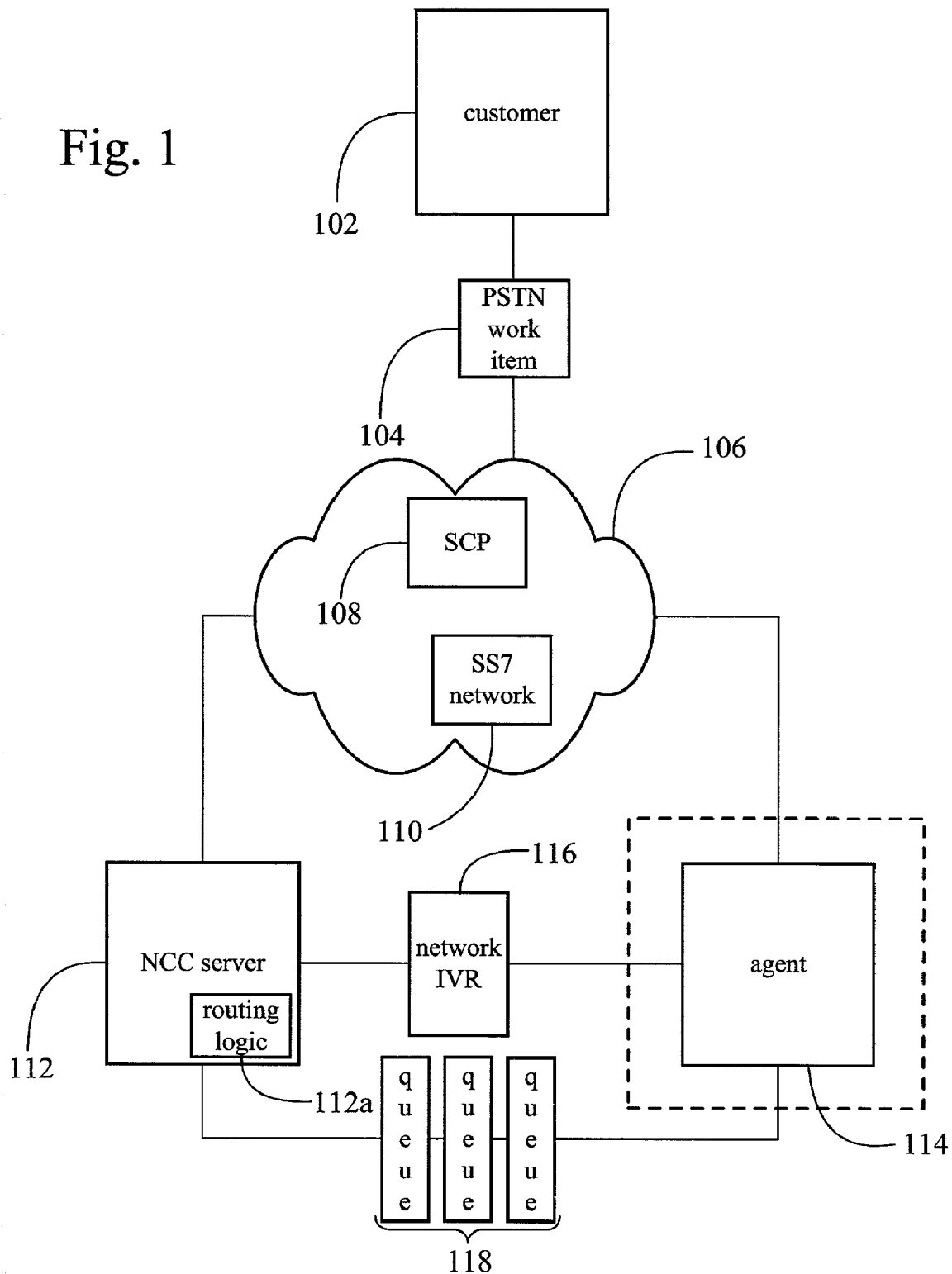
FIG. 1 is a block diagram presenting the arrangement of components in distributing and responding to a PSTN work item, according to one embodiment of the present invention.

With reference to FIGS. 1 though 5, preferred embodiments of the instant invention are presented. A network contact center as contemplated by the present invention acts as an access point for interacting with potentially geographically distributed human and software agents through a variety of channels. As used herein, the various interactions that may be conducted by customers are referred to as "work items". As will be explained in greater detail herein, different work items are received by the system and handled in a manner commensurate with the type of work item received.

FIG. 1 presents a configuration used to handle work items received from the Public Switched Telephone Network (PSTN). Accordingly, a customer 102 wishing to contact an agent 112, either a human or software agent, uses customer premises equipment (not pictured) to initiate communication channel via the PSTN 106. An exemplary piece of customer premises equipment is a standard telephone or private PBX telephone system connected to the PSTN 106. Using the customer premises equipment, the customer 102 generates a PSTN work item 104, e.g., a voice telephone call.

Within the PSTN 106, the SS7 network 110 is the system that puts the information required to set up and mange telephone calls in a separate network rather then within the same network that the telephone call is made on, e.g., out-of-band signaling. Because control signals travel in a separate network from the call itself, it is more difficult for anyone to violate the security of the system. The use of out-of-band signaling techniques, therefore, provides for calls to be set up with greater efficiency and security. The SS7 network allows the system of the present invention to access features such as fall forwarding and passing calls between agents 114. SS7 110 consists of a set of reserved or dedicated channels, referred to as signaling links, and the network points they interconnect. The network 110 makes use of Service Control Points (SCP) 108 that determine how to route a call or to set up and manage special features.

The PSTN work item 104 generated by the customer 102 is routed through the PSTN network 106 by control information passed across the SS7 network. The PSTN work item is delivered to the destination network call center (NCC) server 112. As will be explained in greater detail herein, the NCC 112 server uses a variety of criteria and data to determine the proper agent 114 that the PSTN work item 104 should be routed to for handling. NCC server routing logic 112a involves determining how work items should be handled, and to which human 114 or automated 116 agent the work should be assigned. Furthermore, the routing logic 112a performed by the NCC server is based on configurable logic, thereby allowing the processes executed by the NCC to be easily adapted to new routing scenarios.

The NCC server executes its routing logic 112a and transfers the PSTN work item 104 for processing by the appropriate agent 114. Using advanced features of the PSTN and SS7 networks, 106 and 110 respectively, the PSTN call is connected to the agent and a direct conversation initiated. Alternatively, where the agent 116 is a software process, the "conversation" initiated after transfer from the NCC server may involve collecting data through interactive voice response technologies well known to those skilled in the art.

Using components presented in FIG. 1, as well as the following figures, the NCC server's routing logic 112a supports both "call rich" and "agent rich" environments, as well as hybrids of the two. In an "agent rich" environment, the NCC 112 server chooses the best suited agent 114 or 116 for receipt of a work item based on a myriad of factors. For example, the skill set of an agent or an agent's history with a customer may be used to route an incoming work item. In a "call rich" environment, work items may be put on a specific queue 118 based on the broad category of support that is needed to satisfy the work item. Routing logic 112a is used to decide, once an agent 114 becomes available, from which queue 118 a work item should be taken. As in an "agent rich" environment, the routing decision is based on a myriad of factors, including which queue category or categories the agent is best suited for, how long the work item has been waiting on the queue, how long the queues are overall, etc.

Figure 2:
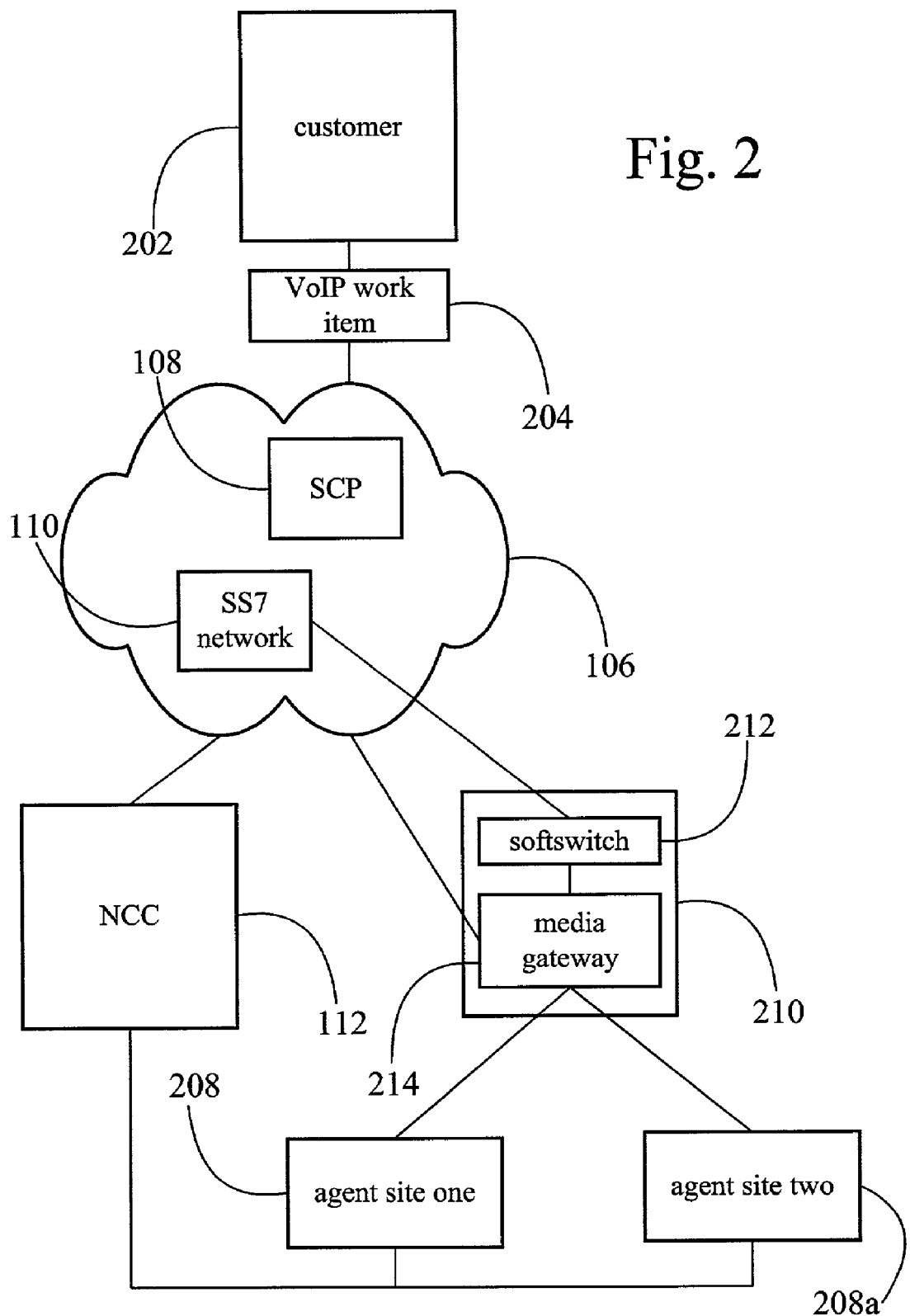
FIG. 2 is a block diagram presenting the arrangement of components in distributing and responding to a VoIP work item, according to one embodiment of the present invention.

As should be understood by the nature of work items, each work item typically makes use of disparate hardware and software resources in order to be processed, e.g., routed. FIG. 2 presents the configuration of components necessary to properly route a VoIP work item according to one embodiment of the present invention. VoIP (voice over IP, or voice delivered using the Internet Protocol) is a set of protocols for managing the delivery of interactive voice information using the Internet Protocol. In general, this means sending voice information in digital form comprising discrete packets rather than in the traditional circuit-committed protocols of the public switched telephone network.

Using computing equipment, e.g., personal computer with VoIP client software, a customer 202 starts a VoIP session that generates a VoIP work item 204. Computing equipment utilized by the customer 202 is connected to a network operative to transport data, for example, the Internet, which is used to passed the VoIP work item to its intended destination. The NCC server 112 receives the VoIP work item 204, where information regarding the VoIP work item is analyzed. As will be described in greater detail herein, the NCC server 112 uses information extracted from the work item 204, and according to some embodiments the type of work item, in order to determine the proper agent 208 to which the work item should be routed. The proper agent 208 is determined and the work item routed appropriately. It should be further noted that all parameters necessary for the agent 208 to complete the connection with the customer 202 are also routed from the NCC 112 to the agent 208, including any customer information retrieved from system databases.

In order for the selected agent 208 to receive the VoIP work item 204 and initiate communication with the customer 202, a packet switch 210 is provided. The packet switch comprises a softswitch 210 and a media gateway. The softswitch 212 (software switch) may comprise any open application program interface (API) software used to bridge a PSTN 106 and voice over the Internet protocol. The softswitch operates by separating the call control functions of the VoIP communication from the media gateway 210. The media gateway 210, in turn, acts as the transport layer for the communication of the VoIP data packets and provides a gateway between the data and PSTN networks. In the Open Systems Interconnection (OSI) communications model, the transport layer ensures the reliable arrival of messages and provides error checking mechanisms and data flow controls. It should also be noted that the use of a softswitch does not require that a call be VoIP. The softswitch may be configured to handle PSTN calls in addition to VoIP calls.

The present invention contemplates the use of one or more agents 208 and 208a, each capable of handing and responding to one or more types of work items. Accordingly, as the agents 208 and 208a are each connected to one or more voice or data networks, they may be geographically separated to thereby create a virtual contact center. It is to be understood that while the agents 208 and 208a may be geographically dispersed, the NCC server 112 operates to provide a seamless interaction between customers and agents by routing work items to the appropriate agent without knowledge of the customer. The NCC server 112 presents the illusion of a single unified contact center to the customer 202.

Figure 3:
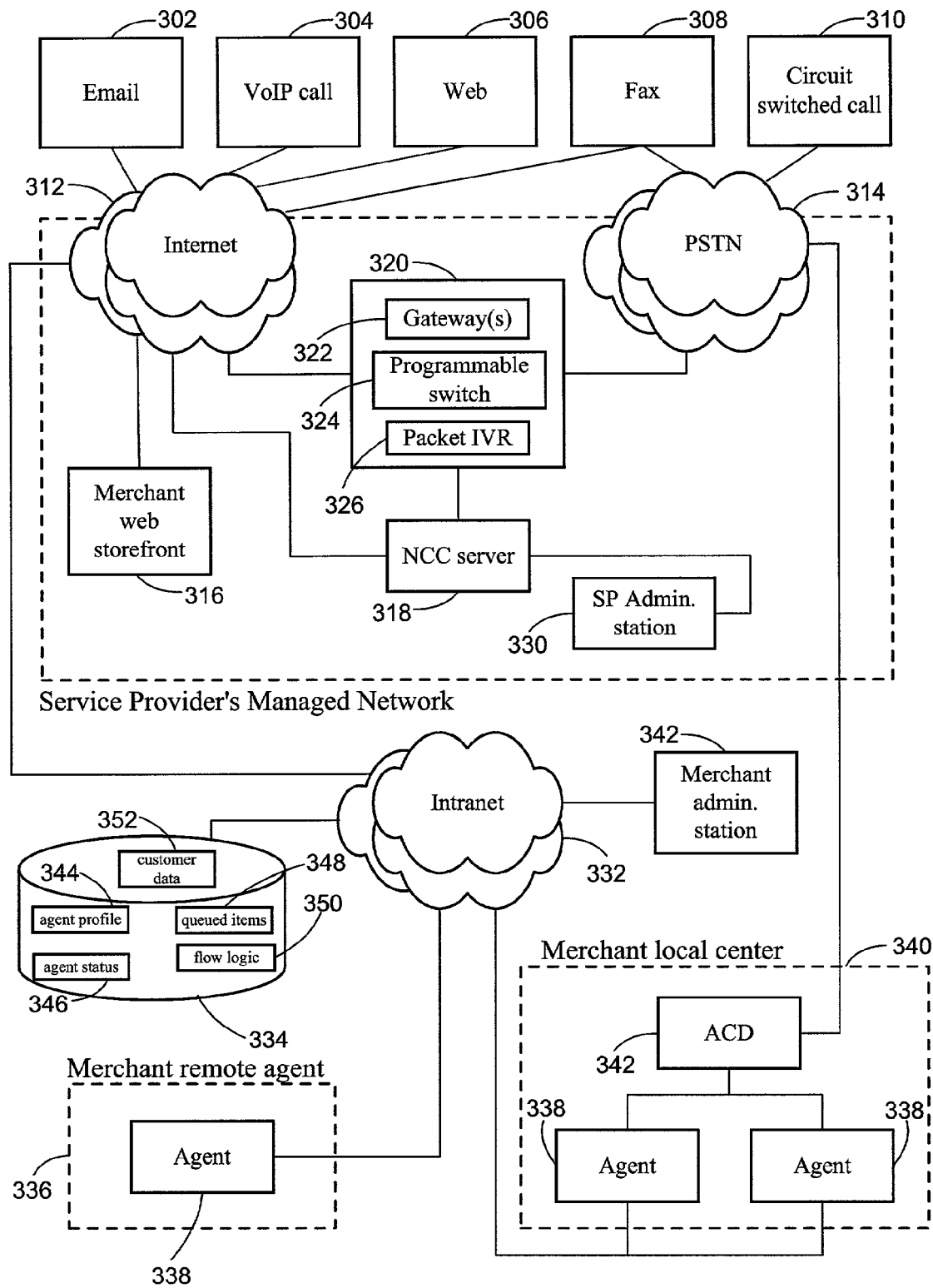
FIG. 3 is a block diagram presenting the arrangement of components of the end-to-end network architecture for a network contact center service deployment according to one embodiment of the present invention.

FIG. 3 builds on the configurations presented in FIGS. 1 and 2 by presenting a block diagram comprising the arrangement of components of the end-to-end network architecture for a network contact center service deployment according to one embodiment of the present invention. As described previously, work items may take a number of forms, e.g., PSTN calls and VoIP calls. The NCC server 318 is configured to handle both work items that may be described as "interactive", as well as those best described as "fulfillment" work items. Interactive work items include all customer contact work that is conducted in real time, e.g., PSTN or circuit switched voice calls 310, VoIP calls 304, live text chat over the web 306, as well as non-real-time interactions including email 302 and fax 308. Fulfillment work items include all non-real-time activities executed in the course of fulfilling a customer's request that are not part of the customer interaction process. Real time work items must always be treated as interactive work, whereas non-real-time work items may be treated as either interactive or fulfillment work items, depending on the particular circumstances.

A customer may generate different work items 302, 304, 306, 308, and 310 in a number of different ways and utilizing different hardware and software. Customers interacting with a merchant web site 316 or other information system over a data network such as the Internet 312 are typically provided with graphical controls to allow the customer to set up a live interaction with a merchant's agent 338. Selecting a live interaction control generates a web work item 306, e.g., live text chat via a web interface. The web work item is transmitted by the merchant's web server via a network 312 to the NCC server 318 for routing to an appropriate agent 338. One skilled in the art should understand that the system is capable of managing other types of work items, and the management of such work items is contemplated by the invention.

Figure 4:
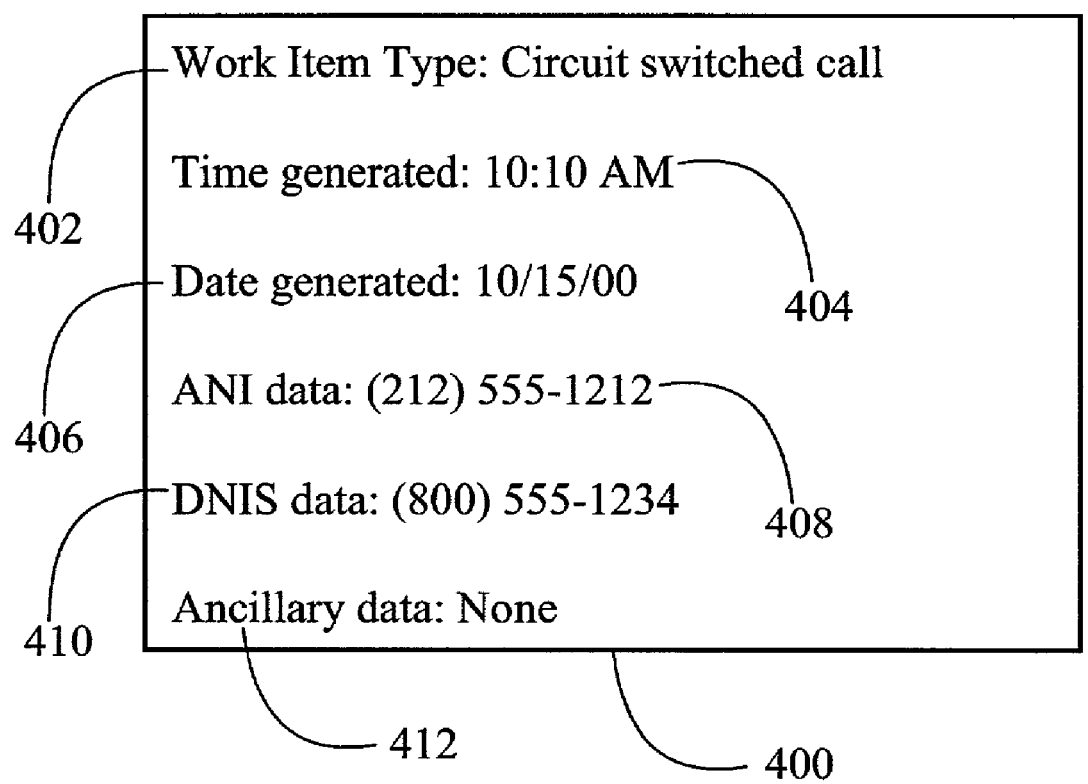
FIG. 4 is a block diagram presenting a work item data file according to one embodiment of the present invention.

The web work item 306 generated by the merchant's web storefront 316 contains ancillary information in addition to the bare request for a session with an agent 338. Turing to FIG. 4, an exemplary work item is presented. The work item, which may be a data file 400 or data stream, comprises information regarding the customer, the request, or both. An exemplary work item 400 comprises the work item type 402 so that the NCC server may identify and index it in the system database. The work item also contains the time 404 and date 406 on which the work item was generated. Where applicable, the work item preferably comprises Automatic Number Identification (ANI) data 408 indicating the number from which a call is originating and Dialed Number Identification Server (DNIS) data 410, which may be used to determine the specific number dialed when a plurality of numbers connect to a central destination.

As will be explained in greater detail herein, the work item may comprise ancillary information 412 depending on the work item type. For example, circuit switched 310 or VoIP calls 304 may be connected with a packet interactive voice response (IVR) system 326 under the control of the NCC server 318. The NCC server 318 uses the IVR 326 to collect information regarding the user or the nature of the agent request, which may be added to the work item. Alternatively, ancillary data may include the email or IP address of a user generating the work item. The data fields presented in this work item are exemplary. One skilled in the art will recognize that many types of data may be included in a work item depending on the type of the work item and any specific requirements of the merchant.

Turning back to FIG. 3, the NCC server 318 receives the web work item and assumes control over the user's session with the merchant's web storefront server 316. The NCC server 318 manages the web server 316 in such a way as to conduct an automated dialogue with the customer. The control exercised is similar to the automated dialogue that an IVR system might have with a user. The NCC server 318 is operative to collect information from and present information to a user in the period prior to connection with an agent 338. For example, the NCC server may request a customer account number, ask customer questions in order to better segment the contact, inform the customer regarding system status (e.g., expected wait time), or play targeted messages to a customer prior to establishing a connection with an available agent.

The use of the NCC server 318 to conduct this functionality as opposed to a web server (e.g., using CGI scripts) is twofold. First, the NCC server 318 is capable of accessing the merchant's database 334 to retrieve and present information relevant to the dialogue that the web server does not have.

Second, it is more efficient to use the NCC server 318 to specify the automated dialogues that are relevant to connecting customers with agents as similar dialogues are preferably present for use with the IVR system 326.

Based on the information contained in the work item 302, 304, 306, 308, and 310, as well as any information collected by the NCC server 318, the merchant's database 334 is accessed to determine if the customer has previously interacted with the system. The merchant's database 334 contains information regarding the merchant's customers. Furthermore, in order to provide enhanced security, the merchant database 334 preferably resides on a private Intranet 332, which is further connected to a public data network such as the Internet 312. Any customer record in the merchant's database 334 is updated to reflect any additional information collected by the NCC server 318. Alternatively, where no customer record is located, a new record is generated and populated with information collected by the NCC server 318 and contained in the work item. In accordance with further embodiments of the invention, the database may be partitioned with management shared between the merchant and service provider. Accordingly, a part of the database may reside within the service provider's managed network for storage and management of data regarding agent status 346, queued work items 348, and agent profiles 344, e.g., agent skill sets and ability to field incoming work items, and workflow logic 350 to be executed by the NCC server 318. Another part of the database may reside within the merchant's Intranet and maintain information regarding the merchant's customer base 352.

The system is further capable of receiving voice work items, 304 and 310, where a customer is attempting to initiate a voice conversation with an agent 338. Voice calls may be placed in one of two ways: using standard customer premises equipment, e.g., a telephone, connected to the public switched telephone network 314, or using computer equipment connected to a data network such as the Internet 312 communicating according to the VoIP protocol. Using customer premises equipment, the call is transported over the PSTN network 314 and connected to the service provider's local network equipment 320, which includes a packet IVR system 326 used as a voice interface to the NCC server 318. As explained previously, VoIP communications utilize a switch 324, optionally a programmable switch, to separate call control functions of the VoIP call from the gateway 322, which acts as the transport layer for the communications. The use of a programmable switch permits the future incorporation of new media types and signaling protocols for use by the NCC server 318.

VoIP 304 and circuit switched calls 310 are transported over their respective networks, 312 and 314, and are connected to the IVR system 326. The IVR system 326 is under the control of the NCC server 318. The NCC server 318 determines and controls the IVR via control messages, for example "AIN 1299" messages. Alternatively, where the IVR resides in a softswitch, the NCC may control the IVR via, for example, SIP messages. The IVR 326 is used to provide the customer a menu of options and collect additional information to determine how to route the call.

The NCC server 318 interfaces with the merchant database 334 to retrieve information that is verbalized to the customer via the IVR 326. For example, a customer may access account information stored in the merchant's database 334 by providing the account number and the correct password. Another example is where the customer verbally supplies an account identifier and requests to talk to an agent. The NCC server 318 may use the account identifier to retrieve information regarding the customer based on the account identifier collected via the IVR from the customer. The IVR system 326 preferably comprises functionality for DTMF tone recognition, whole word recognition, and text-to-speech in order to facilitate interactions between the NCC server 318 and the customer.

Circuit switched calls 310 may use the PSTN 314 to place calls directly to a merchant location 340, bypassing the NCC server 318. Incoming calls received at the merchant center 340 are passed to an automatic call distributor (ACD) 342. The ACD 342 comprises logic instructing it as to the destination agent 338 that a circuit switched work item should be routed to. Alternatively, the ACD call routing logic may be hosted on the merchant's database 334 and modified using the merchant's administrative station 342.

The merchant database 334 maintains system state information, including the status of individual agents 338 that are logged into the system. Circuit switched calls 310 received across the PSTN 314 and distributed to ACD are routed to individual agents 338. When the agent receives a call and therefor becomes occupied and unable to field other incoming work items, the NCC server 318 must be notified so as to account for the agent being occupied. Software executing on the agent's workstation (not pictured) transmits an update message to the NCC server 318, which updates the agent's status information in the merchant's database 334. When the call is terminated, the agent's software sends another message to the NCC server 318, which once again updates the agent's 338 status.

In addition to storing customer information 352, the merchant database 334 is used by the NCC server 318 to maintain agent status information 346, system availability information, system status information, and statistical information regarding received work items. Information regarding each work item that has been handled by the system is tracked by storing the information in the merchant's database 334. Advantageously, work item information may be indexed by or associated with information regarding a customer. A system administrator may use the administrative station 342 to analyze the data. The resultant data is used to derive statistics such as the most popular method of accessing the system, the preferred method of accessing the system for each customer as manifested by their actual access habits, the number of users that are accessing the system through a particular channel, etc.

Agent profiles 344 are stored in the merchant database 334. The profile stores information regarding an agent's skill set (e.g., types of questions they are capable of responding to, as opposed to types of work items) and methods of routing various types of work items to agents (e.g., IP addresses for an agent's workstation or telephone number that a circuit switched call should be transferred to in order to reach a specific agent). Furthermore, the database stores real time agent status information 346 from agents to assist the NCC server in making routing decisions. For example, as agents become occupied responding to received work items, this status information is recorded in the database 334 and associated with the agent. The NCC server 318 also uses the agent status information 346 to calculate derived statistics including, but not limited to, the number of customers awaiting service (queued) and the approximate wait time until an agent is available for server.

As mentioned in the preceding paragraph, the NCC server 318 uses the merchant database 334 to track work item placed in queues 348. Situations arise where all agents currently logged into the system are occupied, or where a work item must be routed to a specific agent who is occupied at the time the work item is routed. In these instances, the NCC server 318 places the work item into the queue 348. Using system statistics stored in the merchant database 334, the NCC server is operative to calculate and present to the queued user information regarding the queue period. Exemplary information presented to the user includes providing information regarding the approximate time until an agent is free to act on the work item or the number of work items to be processed ahead of the customer. Upon reaching periodic time thresholds, the NCC server 318 may check the system to determine if any work items presently on the queue 348 may be routed, and take appropriate action.

The database 334 also maintains the flow logic 350 used by the NCC sever 318 to route incoming work items to agents. Merchant administrative workstation 342 and the service provider's administrative workstation 330 may be used to access this program logic 350 executed by the NCC server 318. Use of the program logic 350 in combination with customer data and system status information, e.g., availability of agents, allows the NCC server 318 to properly route work items. The program logic is fully updateable and may be modified to take into account new situations and circumstances encountered by the system.

Routing of a work item 302, 304, 306, 308, and 310 by the NCC server 318 to an appropriate agent 338 may be based on a variety of criteria as defined by flow logic 350 stored in the merchant database 318 and executed by the NCC server. Routing may be performed based on information contained within the work item, based on information regarding the status of the system, or a combination of the two. For example, routing criteria may include, but is not limited to, how the work item originated, e.g., the type of the work item, the identity of the customer generating the item, the business value of the item, the current status of agents connected to the system.

Depending on the type of work item received and the specific routing workflow executed, the work item is routed to an agent according to a wide variety of parameters. According to some embodiments, specific agents are identified as qualified to handle particular types of questions or particular types of work items. The NCC server 318 routes work items to qualified agents by comparing the data contained within the work item with the qualifications of all logged in agents. According to another embodiment, which builds on the previous embodiment, the NCC server 318 routes the received work item to the qualified agent with the least number of queued work items.

As previously described, a plurality of parameters are accumulated from the source of the work item and/or interactive querying of the customer. These data can also be used alone or in conjunction with other data to route work items. For example, based on the location that a customer is calling from, which is derived from a phone number received from ANI parameters. Likewise routing may be based on the particular number a customer dialed to contact the system, which is determined through DNIS parameters. Furthermore, routing can be dependent on the time or day of the week that a work item is generated, e.g., routing the work item to a local merchant center 340 on even days of the week and to a remote merchant location 336 on odd days of the week. It should be clear to those skilled in the art that the routing of work items may be based on any number or combination of data available to the NCC server 318.

The NCC server 318 supports post routing call transfers and call conferencing initiated by agents 338. When a work item is transferred to an agent 338, along with associated customer information, the NCC server 318 updates the agent's profile 344 to indicate that the agent is occupied. When the agent 338 initiates a call transfer, to either another human agent or a software agent such as an IVR system, the NCC server 318 updates the transferring agent's profile 344 to indicate that the user is no longer occupied. The NCC server 318 accesses the transferee agent's profile 344 to ensure that he or she is not occupied and completes the transfer, passing all information regarding the work item to the transferee agent. Where the transferee agent is occupied, the work item is placed into a queue 348 associated with the agent until the agent is no longer occupied. The NCC server 318 also provides the transferee agent with information regarding the transferring agent, thereby allowing the transferee agent to open a communications channel with the transferring agent if required.

Figure 5:
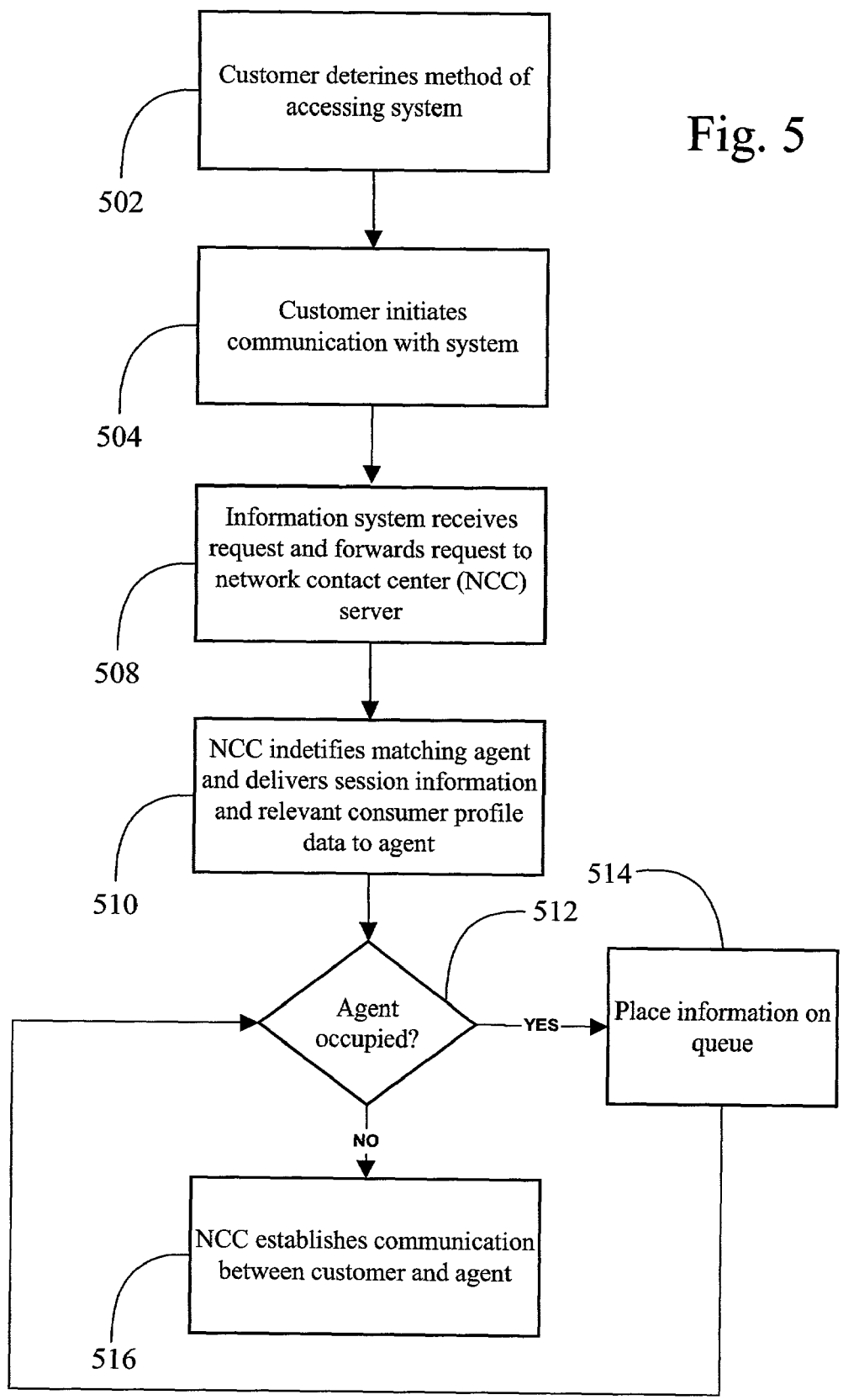
FIG. 5 is a flow diagram presenting a method of operating a network contact center, according to one embodiment of the present invention.

A high level method of operating the system illustrated in FIGS. 1 through 4 is presented in FIG. 5. The customer determines the method that is going to be used to access the system, step 502. Because the system is operative to interact with customers through a variety of communication channels, the user is free to determine the method best suited to his or her preferences. Exemplary communication channels include, but are not limited to, live web based text chat, circuit switched telephone calls, VoIP telephone calls, electronic mail, and fax. Using the selected communication channel, the customer initiates communication with the system, step 504.

The information system receives the customer's communication request, which is forwarded to the network contact center (NCC) server, step 508. For example, suppose the customer desires to initiate a web based text chat with an agent. The customer, using standard personal computer equipment connected to a communications network such as the Internet and browser software, navigates to the destination address for the information system, e.g., the server's Uniform Resource Locator (URL). Upon reaching the destination server, controls are accessed to initiate the desired web based text chat. Selection of the control or controls associated with initiating the web based text chat instructs the information system to forward the request as a web work item to the NCC server.

The NCC server receives the work item from the information system that generated the item and identifies a matching agent, step 510. Matching a work item to an agent may be performed in a number of ways including, but not limited to, the availability of an agent, general call load handled by all the available agents, the skill set of an agent, the time the work item was received, or the day of the week that a work item was received. Combining various matching techniques may also be performed to match a work item with an agent. When the proper agent is selected, the session information contained within the work item, in addition to any relevant information retrieved from a customer's profile, if available, is delivered to the agent, step 510.

The work item is transmitted to the destination agent, step 510, and a check is performed to determine if the agent is presently attending to the needs of another customer, step 512. Where the agent is occupied, step 512, the work item is placed on a queue to await agent availability, step 514. Periodically, the check is re-executed to determine if the agent has become available, step 512. Alternatively, the customer may force the check to determine if the agent has become available, step 512. If the agent is not occupied, step 512, the NCC server establishes communication between the customer and the selected agent, step 516.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system for matching a given work item with an agent, the given work item being one of a plurality of work items transported from a customer to an agent by way of a network, the system comprising:
   a database to hold customer information, agent information, and system information; and
   a network contact center server, the server operative to receive the given work item from the customer and route it to the agent based at least in part on the information in the database;
   wherein the network contact center server is configured to control the conduction of an automated web dialogue with the customer via a separate web server and is further configured to control the conduction of an automated voice dialogue with the customer via an interactive voice response system, the automated web dialogue and the automated voice dialogue thereby both being conductable under the control of the network contact center server.

2. The system of claim 1 comprising a plurality of agents which are geographically distributed.

3. The system of claim 1 wherein the network contact center server routes the given work item to the agent according to at least one flow logic instruction.

4. The system of claim 3 wherein the flow logic instruction routes the given work item to the agent according to an agent profile.

5. The system of claim 4 wherein the agent profile comprises data regarding an agent skill set.

6. The system of claim 3 wherein the flow logic instruction routes the given work item to the agent according to a time of day that the work item was created.

7. The system of claim 3 wherein the flow logic instruction routes the given work item to the agent according to a day of the week that the work item was created.

8. The system of claim 3 wherein the flow logic instruction performs load balancing to route the given work item to the agent attending to the fewest number of work items.

9. The system of claim 1 wherein the network contact center server utilizes at least one of the web server and the interactive voice response system to collect additional information from the customer.

10. The system of claim 9 wherein the network contact center server merges the additional information collected from the customer into the given work item.

11. The system of claim 1 wherein the automated dialogues are stored on the database.

12. The system of claim 1 wherein the network contact center server queries an agent profile to determine whether an appropriate agent is occupied and, if so, to place the given work item in a queue.

13. The system of claim 12 wherein the network contact center server routes the given work item to an agent if the agent is not occupied.

14. The system of claim 12 wherein the network contact center server periodically queries the agent to determine agent availability.

15. The system of claim 14 wherein the network contact center server queries the agent to determine the agent's availability when a user defined threshold has been exceeded.

16. The system of claim 14 wherein the network contact center server removes the given work item from the queue and routes the given work item to the agent when the agent becomes available.

17. The system of claim 12 wherein, after a time period has elapsed, the network contact center server removes the given work item from the queue and routes the work item to any available agent.

18. The system of claim 1 wherein the network contact center server places the given work item on a queue based on a broad category of support required to satisfy the work item.

19. The system of claim 18 wherein the network contact center server decides, once an agent becomes available, from which queue the given work item should be taken.

* * * * *